(12) United States Patent
Hébert et al.

(10) Patent No.: US 11,079,323 B2
(45) Date of Patent: Aug. 3, 2021

(54) METHOD OF FREQUENCY COMB GENERATION, ASSOCIATED GENERATION MODULE, REMOTE SPECTROSCOPY METHOD AND ASSOCIATED SPECTROSCOPY DEVICE

(71) Applicants: CENTRE NATIONAL D'ETUDES SPATIALES, Paris (FR); Office National d'Etudes et de Recherches Aérospatiales, Palaiseau (FR)

(72) Inventors: Philippe Hébert, Toulouse (FR); François Lemaître, St Orens de Gameville (FR); Xavier Orlik, Pechabou (FR); Thibault Dartigalongue, Toulouse (FR)

(73) Assignees: CENTRE NATIONAL D'ETUDES SPATIALES, Paris (FR); OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 480 days.

(21) Appl. No.: 15/986,499

(22) Filed: May 22, 2018

(65) Prior Publication Data
US 2018/0340885 A1    Nov. 29, 2018

(30) Foreign Application Priority Data
May 23, 2017    (FR) ..................................... 17 54571

(51) Int. Cl.
*G01N 21/39*    (2006.01)
*G01S 7/48*    (2006.01)
(Continued)

(52) U.S. Cl.
CPC ............ *G01N 21/39* (2013.01); *G01S 7/4802* (2013.01); *G01S 7/484* (2013.01); *G01S 17/88* (2013.01);
(Continued)

(58) Field of Classification Search
CPC ........... G01J 3/453; G01J 3/42; H01S 3/0078; G01N 21/39
See application file for complete search history.

(56) References Cited

U.S. PATENT DOCUMENTS

| | | | |
|---|---|---|---|
| 9,190,797 B2 | 11/2015 | Schneider | |
| 2015/0236467 A1* | 8/2015 | Schneider | ............. H01S 3/0085 372/32 |

(Continued)

FOREIGN PATENT DOCUMENTS

| | | |
|---|---|---|
| EP | 2908168 A1 | 8/2015 |
| FR | 3027116 A1 | 4/2016 |
| FR | 3039331 A1 | 1/2017 |

OTHER PUBLICATIONS

Yokoyama et al., "Terahertz Frequency Comb for High-accuracy, High-resolution Terahertz Spectroscopy", Conference on Lasers and Electro-Optics, 2007, pp. 1-2, XP031230960.
(Continued)

*Primary Examiner* — Luke D Ratcliffe
(74) *Attorney, Agent, or Firm* — Burris Law, PLLC

(57) ABSTRACT

A method of generating frequency combs composed of a predetermined number of rays, wherein the method includes the modulation of a main ray generated by a laser source (20), by a first radiofrequency signal at a first frequency value, by a second radio frequency signal at a second frequency value, and by a third radio frequency signal at a third frequency value. The second frequency value is equal
(Continued)

to twice the first frequency value. The third frequency value is equal to three times the first frequency value.

13 Claims, 3 Drawing Sheets

(51) Int. Cl.
  *G01S 17/88* (2006.01)
  *G01S 7/484* (2006.01)
  *G01N 21/17* (2006.01)

(52) U.S. Cl.
  CPC ............... *G01N 2021/1795* (2013.01); *G01N 2021/394* (2013.01)

(56) References Cited

U.S. PATENT DOCUMENTS

| | | | | |
|---|---|---|---|---|
| 2015/0326320 | A1* | 11/2015 | Fertig | H01S 3/1304 398/115 |
| 2018/0216996 | A1* | 8/2018 | Kieu | G01N 21/39 |
| 2019/0391016 | A1* | 12/2019 | Bourbeau Hebert | G01B 9/02007 |

OTHER PUBLICATIONS

French Search Report, dated Feb. 22, 2018, from corresponding FR application No. 1754571.

\* cited by examiner

METHOD OF FREQUENCY COMB GENERATION, ASSOCIATED GENERATION MODULE, REMOTE SPECTROSCOPY METHOD AND ASSOCIATED SPECTROSCOPY DEVICE

FIELD OF THE INVENTION

The present invention relates to a method of generating frequency combs and an associated generation module.

The present invention also relates to a method of remote spectroscopy and an associated spectroscopy device.

BACKGROUND OF THE INVENTION

Various methods of remote spectroscopy are already known in the prior art. An example of such a spectroscopy method is described, in particular, in application FR 3039331.

This spectroscopy method is called "LIDAR" which means that it is implemented by a remote sensing and optical measurement tool known by the term "LIDAR". The term "LIDAR" is an acronym for "light detection and ranging".

In particular, this method makes it possible to study the composition of a targeted material located at a distance from the LIDAR by emitting a light wave at a given frequency towards this material and then receiving a light wave reflected from this material.

Thus, by comparing this reflected light wave with the initial wave or with a reference signal, it is, for example, possible to determine the absorption coefficient of the material, which generally makes it possible to determine the precise composition of the material.

The light wave is emitted by the LIDAR in the form of a frequency comb that is generally composed of a plurality of light rays. These rays are generated from a laser signal by one or more modulators with a predetermined frequency, using generation methods known per se. This frequency is chosen, in particular, according to the desired sampling fineness.

All the rays of the comb are sent simultaneously to the targeted material, subsequently reflected by this material, and then received by the LIDAR. By mixing it with the reference signal, the received light wave makes it possible to obtain an interferogram of the targeted material. Its Fourier transform then provides a spectrum of the targeted material, i.e. a precise composition of this material.

The quality of the sampling therefore depends to a great extent on the quality of the combs sent to the targeted material.

In particular, to ensure good sampling quality, the rays of these combs must be perfectly controlled and stable.

In addition, in order to obtain a more complete break down of the targeted material, these combs must contain a large number of rays, which makes it possible to cover a large frequency spectrum of the targeted material.

However, by applying existing phase modulation comb generation methods, it is often difficult to increase the number of rays in a comb beyond nine while ensuring the stability of this comb.

SUMMARY OF THE INVENTION

The object of the present invention is to propose a generation method that makes it possible to obtain a particularly stable comb whose number of rays is greater than nine and preferably equal to thirteen.

To this end, the object of the invention is a method of generating frequency combs composed of a predetermined number of rays, wherein the method comprises the modulation of a main ray generated by a laser source, by a first radiofrequency signal at a first frequency value, by a second radio frequency signal at a second frequency value, and by a third radio frequency signal at a third frequency value; wherein the second frequency value is equal to twice the first frequency value; and wherein the third frequency value is equal to three times the first frequency value.

According to other advantageous aspects of the invention, the generating method comprises one or more of the following characteristics, taken separately or in any technically feasible combination:

the comb is composed of thirteen rays regularly spaced from each other by the first frequency value and substantially equal to each other in power;

the modulation by the first radiofrequency signal is carried out with a modulation amplitude substantially equal to 1.6418 radians and a relative phase shift substantially equal to 21.8°;

the modulation by the second radiofrequency signal is carried out with a modulation amplitude substantially equal to 1.3549 radians and a relative phase shift substantially equal to 43.6°;

the modulation by the third radio frequency signal is carried out with a modulation amplitude substantially equal to 2.2829 radians and a relative phase shift substantially equal to 245.4°;

the method comprises the following steps:
  A) generation of a main ray by a laser source;
  B) generation of a first plurality of rays by modulating the main ray by one of the said radio frequency signals;
  C) generation of a second plurality of rays by modulating each ray of the first plurality of rays by one of the said radio frequency signals other than the radio frequency signal used in step B);
  D) generation of a third plurality of rays by modulating each ray of the second plurality of rays by one of the said radio frequency signals other than the radio frequency signals used in steps B) and C);
  E) formation of a comb from the rays of the third plurality of rays;

wherein the method comprises the following steps:
  A') generation of a main ray by a laser source;
  B') generation of a complex signal corresponding to the sum of the said radio frequency signals;
  C') generation of a main plurality of rays by modulating the main ray by the complex signal;
  D') formation of a comb from the rays of the main plurality of rays wherein the method further comprises a step of modulating the rays of the comb at an additional frequency value greater than the third frequency value; and the additional frequency value is between 20 and 40 GHz.

The invention also relates to a frequency comb generation module composed of a predetermined number of rays, comprising means configured to implement the generation method as defined above.

The object of the invention is also a method for LIDAR-type remote spectroscopy of a targeted material comprising the following steps:

generation of a transmission signal comprising at least one comb generated as previously described;

transmission of the transmission signal to the targeted material;

reception of a response signal corresponding to the transmission signal reflected by the targeted material; and
analysis of the response signal.

According to other advantageous aspects of the invention, the remote spectroscopy method comprises the following characteristic:

the first frequency value is chosen according to the physical characteristics of the targeted material.

The invention also relates to a remote spectroscopy device of the LIDAR type implementing the spectroscopy method as defined above.

BRIEF DESCRIPTION OF THE DRAWINGS

These features and advantages of the invention will become apparent upon reading the following description, given solely by way of non-limiting example, and with reference to the appended drawings in which.

DETAILED DESCRIPTION OF THE INVENTION

In the remainder of the description, the expression "substantially equal to" is understood to mean a relationship of equality plus or minus 10%.

Figure 1:
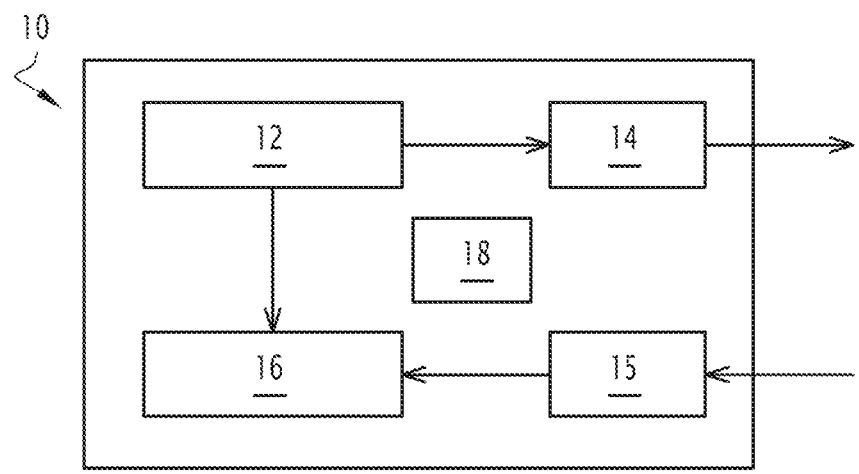
FIG. 1 shows a schematic view of a remote spectroscopy device according to the invention, wherein the device comprises, in particular, a frequency comb generation module.

The spectroscopy device 10 of FIG. 1 is, for example, embedded in a satellite located in a terrestrial orbit and making observations of the Earth, or of another planet, and in particular of an atmosphere layer of a thickness equal, for example, to 15 km.

The spectroscopy device 10 makes it possible to study a targeted material in this atmosphere layer. The targeted material is, for example, a gas composed of several elemental gases, for example $CO_2$, $H_2O$ or $CH_4$.

Each elemental gas is able to absorb a light wave of a determined frequency with a known absorption coefficient.

Thus, the spectroscopy device 10 makes it possible, for example, to determine the densities of the elementary gases contained in the targeted gas by emitting a light signal towards the targeted gas and by analyzing a signal reflected by this gas, or absorbed by it and reflected by a surface in the background.

According to an alternative embodiment, the spectroscopy device 10 is onboard another spatial or ground vehicle, or an aircraft.

According to yet another variant embodiment, the spectroscopy device 10 may be fixedly arranged, for example, on the Earth's surface.

In at least some of the aforementioned embodiments, the spectroscopy device 10 makes it possible to further study a targeted material placed in any medium other than the atmosphere, for example in an underwater or underground environment.

With reference to FIG. 1, the spectroscopy device 10 comprises a frequency comb generation module 12, a transmission module 14, a reception module 15, a post-processing module 16, and a control module 18.

The generation module 12 is able to form a transmission signal and a reference signal respectively intended for the transmission module 14 and the post-processing module 16. Each of these signals comprises at least one frequency comb generated as described later.

The transmission module 14 is a transmission telescope known per se which is adapted to receive the transmission signals from the generation module 12 and to transmit them to the targeted material.

The reception module 15 is a reception telescope also known per se which is able to receive response signals corresponding to the transmission signals emitted by the transmission module 14 and reflected by the targeted material or another material.

According to an alternative embodiment, the telescopes of the transmission modules 14 and the reception modules 15 may be in the form of a single component.

The post-processing module 16 is able to receive the reference signals generated by the generation module 12 and the response signals received by the reception module 15.

The post-processing module 16, in particular, makes it possible to convert the reference and response signals into digital signals whose analysis gives a precise composition of the targeted material. This analysis is performed according to analysis methods known per se.

The control module 18 makes it possible to control the operation of all the modules of the spectroscopy device 10.

The control module 18 is, for example, connected to a central computer (not shown) of the satellite from which it is controlled.

The generation module 12 according to a first embodiment will now be explained with reference to FIG. 2.

Figure 2:
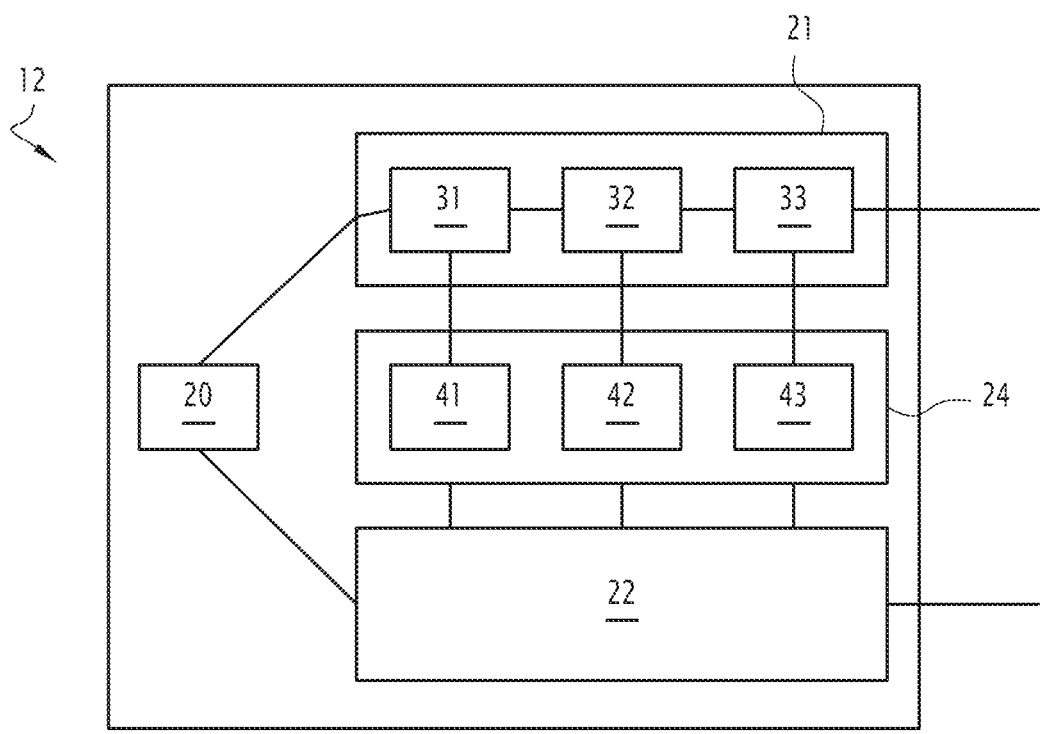
FIG. 2 shows a schematic view of the generation module of FIG. 1, implemented according to a first embodiment.

Thus, as illustrated in FIG. 2, the generation module 12 comprises a laser source 20, two optical channels 21, 22 connected to this laser source 20 by optical guiding means and an electronic device 24 for managing these channels 21, 22.

The laser source 20 is able to emit a laser signal at a generating frequency which is substantially equal, for example, to 200 THz. This laser signal comprises in particular a laser ray, hereinafter called the main ray.

The optical channels 21, 22 are able to receive the laser signal emitted by the laser source 20 in order to respectively form from this signal a transmission signal and a reference signal.

The optical channels 21, 22 are similar to each other and include, in particular, substantially the same components.

Unlike the optical channel 21, the optical channel 22 further comprises means for differentiating the reference signal from the transmission signal.

These means of differentiation are configured according to the construction method chosen to determine the composition of the targeted material. In the embodiment described, these means comprise, in particular, means for delaying the transmission of the reference signal with respect to the transmission signal in order to synchronize this reference signal with the corresponding response signal. These delaying means are known per se and will not be detailed here.

Only the optical channel 21 will be described in detail below.

Thus, as illustrated in FIG. 2, the optical channel comprises three modulators, namely a first modulator 31, a second modulator 32 and a third modulator 33, which are connected in series with the laser source 20.

Each modulator 31 to 33 has, for example, an electrooptic modulator known per se.

Thus, each modulator 31 to 33 is capable of generating by phase modulation, a plurality of rays from each ray passing through the optical channel 21 as a function of a radio frequency signal controlling the operation of this modulator 31 to 33.

For this purpose, the electronic management device 24 comprises three management units, i.e. a first management unit 41 associated with the first modulator 31, a second management unit 42 associated with the second modulator 32, and a third management unit 43 associated with the third modulator 33.

Each management unit 41 to 43 makes it possible to drive the modulator 31 to 33 associated with it by generating a sinusoidal radiofrequency signal with a given modulation amplitude, a given relative phase shift, and a given frequency value.

Figure 3:
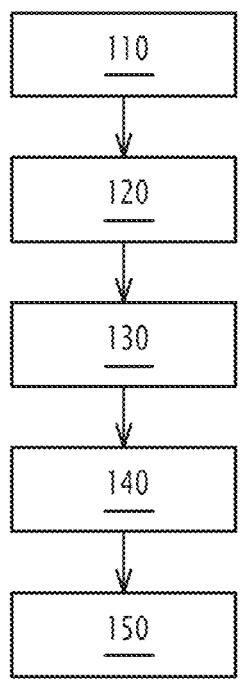
FIG. 3 shows a flowchart of a remote spectroscopy method according to the invention, wherein the remote spectroscopy method is implemented by the remote spectroscopy device of FIG. 1 and comprising, in particular, a method of generating frequency combs.

The remote spectroscopy method implemented by the spectroscopy device 10 will now be explained with reference to FIG. 3 illustrating a flowchart of its steps.

Initially, the targeted material is identified and the transmission 14 and reception modules 15 are respectively configured to transmit a transmission signal to that material and receive a response signal reflected by that material.

In step 110, the control module 18 controls the generation of a transmission signal by the generation module 12.

In the next step 120, the generation module 12 then generates a transmission signal for the transmission module 14 and a reference signal for the post-processing module 16.

The transmission signal comprises a frequency comb generated by the optical channel 21, while the reference signal comprises a frequency comb generated by the optical channel 22 and possibly delayed compared to the comb included in the transmission signal.

Each of these combs is generated according to a frequency comb generation method which is implemented by each of the optical channels 21, 22. The implementation of this method by the optical channel 21 will be explained in more detail below.

In the next step 130, the transmission module 14 transmits the transmission signal generated by the generation module 12 to the targeted material.

In the next step 140, the reception module 15 receives a response signal corresponding to the transmission signal reflected by the targeted material.

In the next step 150, the post-processing module 16 analyzes the received response signal and determines the composition of the targeted material by comparing, in particular, this response signal with the corresponding reference signal.

Figure 4:
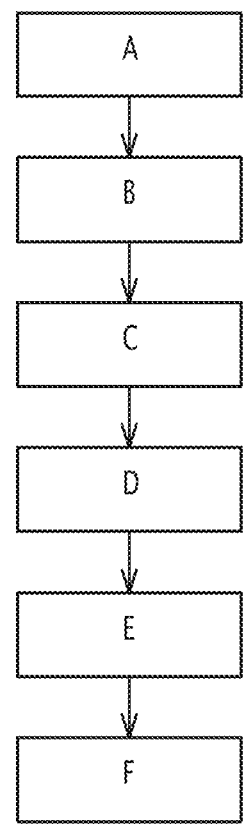
FIG. 4 shows a flowchart of the frequency comb generation method of FIG. 3, implemented according to a first embodiment.

The implementation of the method of generating frequency combs by the optical channel 21 will now be explained with reference to FIG. 4 which illustrates a flowchart of the steps of this method and to FIG. 5 which illustrates the implementation of these steps.

During the initial step A), the laser source 20 generates a laser signal comprising a main ray. This main ray is referenced 50 in FIG. 5.

In the following step B), the first modulator 31 generates a first plurality of rays 51 by modulating the main ray by a first radiofrequency signal at a first frequency value F.

The first radiofrequency signal is generated by the first management unit 41 and is defined with a modulation amplitude substantially equal to 1.6418 radians and a relative phase shift substantially equal to 21.8°.

The first frequency value F is chosen according to the physical characteristics of the targeted material, for example by having an analysis result that best reproduces these characteristics.

The first frequency value F is equal, for example, to 1 GHz.

The modulation implemented during this step results in the generation of three rays equal to each other in power and a multitude of rays with powers much smaller and which will be neglected thereafter.

Thus, the first plurality 51 is composed of three rays, one of which corresponds to the main ray and two others which are on either side of the main ray and are spaced from this main ray by the first frequency value F.

In the following step C), the second modulator 31 generates a second plurality of rays 52 by modulating each ray of the first plurality of rays 51 by a second radiofrequency signal at a second frequency value 2F.

The second radiofrequency signal is generated by the second management unit 42 and is defined with a modulation amplitude substantially equal to 1.3549 radians and a relative phase shift substantially equal to 43.6°.

The second frequency value 2F is equal to twice the first frequency value F.

The modulation implemented during this step results in the generation of three rays equal to each other in power from each ray of the first plurality of rays 51, and a plurality of rays with powers much smaller and which will be neglected thereafter.

Figure 5:
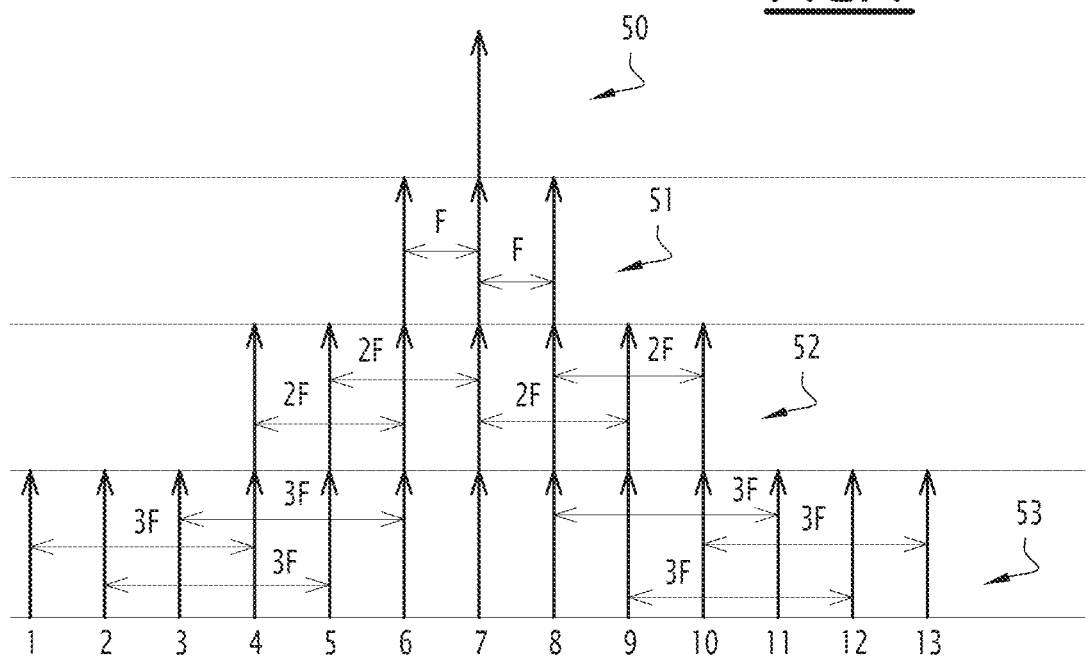
FIG. 5 shows a schematic view illustrating a comb obtained following the implementation of the frequency comb generation method of FIG. 3.

Thus, taking into account the overlap of at least some of the rays as illustrated in FIG. 5, the second plurality of rays 52 is composed of seven rays of equal power which are spaced apart from each other by the first frequency value F.

In the following step D), the third modulator 33 generates a third plurality of rays 53 by modulating each ray of the second plurality of rays 52 by a third radio frequency signal at a third frequency value 3F.

The third radio frequency signal is generated by the third management unit 43 and is defined with a modulation amplitude substantially equal to 2.2829 radians and a relative phase shift substantially equal to 245.4°.

The third frequency value 3F is equal to three times the first frequency value F.

The modulation implemented during this step results in the generation of three rays equal to each other in power from each ray of the second plurality of rays 52, and a plurality of rays with powers much smaller and which will be neglected thereafter.

Thus, taking into account the overlap of at least some rays as illustrated in FIG. 5, the third plurality of rays 53 is composed of thirteen rays of equal power which are spaced from each other by the first value frequency F.

Finally, in the following step E), a comb is formed from the third plurality of rays 53.

This comb thus comprises thirteen rays spaced apart from each other by the first frequency value F.

The method of generating frequency combs by the optical channel 22 is implemented analogously by choosing the first frequency value F to be slightly different from that chosen for the optical channel 21. The difference between the first two frequency values F corresponding to the different optical paths 21, 22 is, for example, equal to 100 kHz.

According to an alternative embodiment of the generation device 12, the modulators 31 to 33 are arranged in series in a different order from that of FIG. 3.

In fact, the order of disposition of these modulators 31 to 33 has no influence on the shape of the final comb which always has thirteen rays spaced by the first frequency value F.

Thus, for example, when the third modulator 33 is put in the place of the first modulator 31 and the first modulator 31 is put in the place of the third modulator during step B), it is the third modulator 33 which generates the first plurality of rays from the main ray. These rays of the first plurality are then spaced by the third frequency value 3F.

Then, as in the previous case, during step C), the second modulator 32 generates the second plurality of rays in which the rays are spaced by the first frequency value F or the second frequency value 2F.

Finally, in step D), the first modulator 31 generates the third plurality of rays in which the rays are spaced by the first frequency value F.

According to another embodiment compatible with one of the variants previously described, the optical channel 21 further comprises an additional modulator placed downstream of the modulators 31 to 33 described above.

Such a modulator is controlled by an additional control unit to modulate each ray passing through this modulator to an additional frequency value FA greater than the third frequency value 3F.

The additional frequency value FA is, for example, between 20 and 40 GHz.

In this case, the generation method described above also comprises a step F) implemented after step E) in which all the rays of the comb formed during step E) are modulated by the additional modulator.

This has the effect of tripling the initial comb, i.e. the generation of two combs on either side of the initial comb.

It will be appreciated that the present invention has a number of advantages.

In fact, the frequency combs obtained by the generation method according to the invention each comprise exactly thirteen rays that are spaced apart from each other by a given frequency value. These rays are stable and perfectly controlled.

This then makes it possible to improve the quality of the analysis result of the corresponding targeted material.

This quality may be further improved by adding further modulation at a high frequency in order to triple the initial comb.

Thus, the transmission signal formed with the three combs makes it possible to cover a greater wavelength range.

Figure 6:
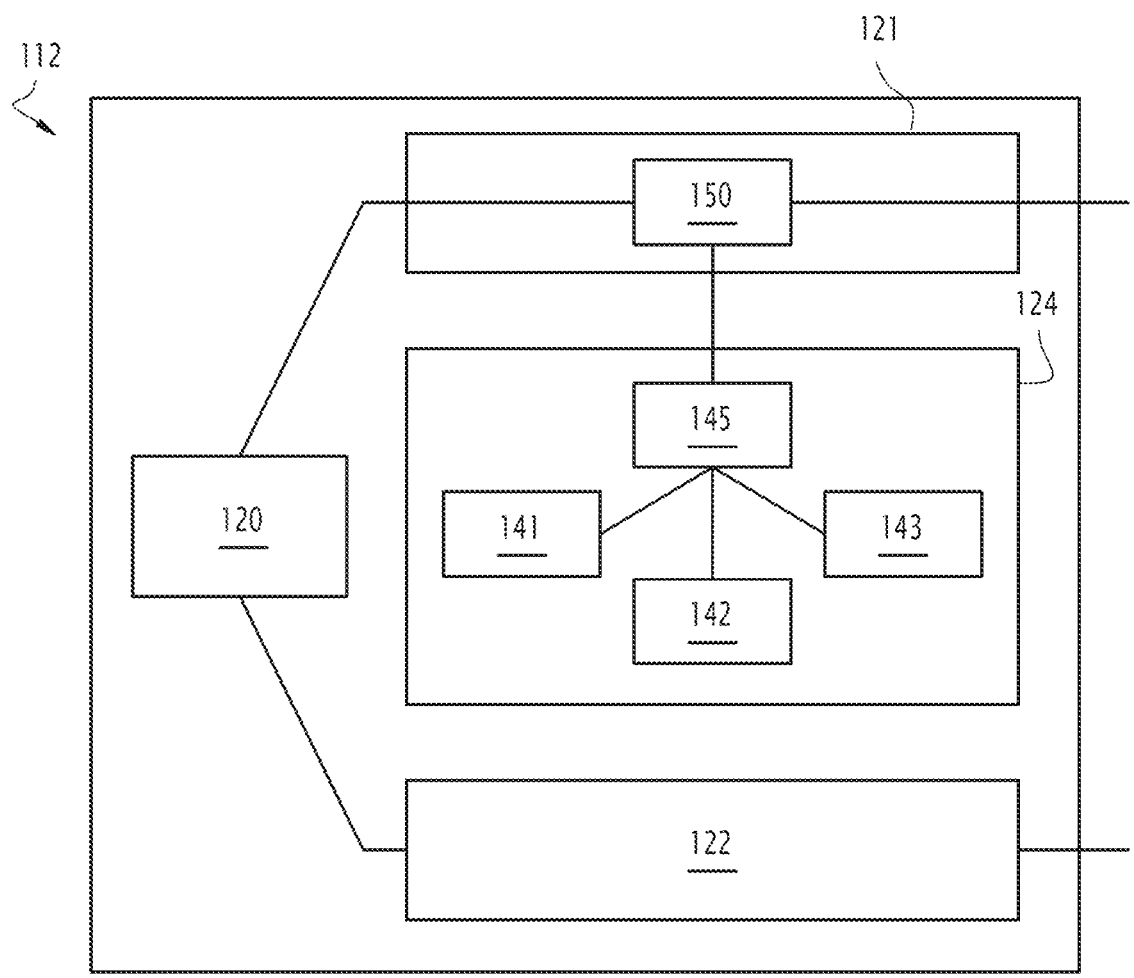
FIG. 6 shows a schematic view of the generation module of FIG. 1, implemented according to a second embodiment.

A frequency comb generation module 112 according to a second embodiment of the invention is illustrated in FIG. 6.

Thus, with reference to FIG. 6, the generation module 112, as in the previous case, comprises a laser source 120, two optical channels 121, 122 connected to this laser source 120 by optical guiding means and an electronic device 124 for management of the channels 121, 122.

The laser source 120 is analogous to the laser source 20 described above.

As in the previous case, the electronic management device 124 comprises three management units, namely a first management unit 141 similar to the first management unit 41 and generating the first radiofrequency signal, a second management unit 142 similar to the second management unit 42 and generating the second radio frequency signal, and a third management unit 143 similar to the third management unit 43 and generating the third radio frequency signal.

Unlike the electronic management device 24, the management device 124 further comprises a generation unit 145 generating a complex signal corresponding to the sum of the first radio frequency signal, the second radio frequency signal, and the third radio frequency signal.

Also, as in the previous case, the optical channels 121, 122 respectively deliver a transmission signal and a reference signal, and differ from each other solely by the presence in the optical channel 122 of means for the differentiation of the reference signal from the transmission signal, in a similar manner to that described above.

Thus, subsequently, only the optical channel 121 will be described in detail.

Unlike the optical channel 21, the optical channel 121 comprises a single modulator 150, referred to as a main modulator, that is similar to one of the modulators 31 to 33 described above.

The main modulator 150 is driven by the complex signal delivered by the generation unit 145. Thus, with such a complex signal, the modulator 150 is able to modulate the main ray passing through the optical channel 121 by respectively the first radiofrequency signal, the second radiofrequency signal, and the third radio frequency signal.

Figure 7:
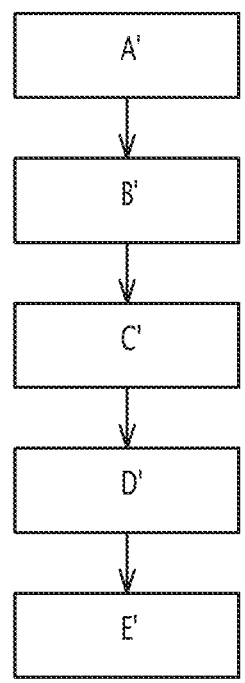
FIG. 7 shows a flowchart of the frequency comb generation method of FIG. 3, implemented according to a second embodiment.

A frequency comb generation method implemented by the frequency comb generation module 112 according to the second embodiment and for the optical channel 121, will now be described with reference to FIG. 7 illustrating a flowchart of its steps.

During step A') that is similar to step A) described above, the laser source 120 generates a laser signal then comprising a main ray.

In the following step B'), the generation unit 145 generates a complex signal corresponding to the sum of the said radio frequency signals. These radiofrequency signals are defined by the same frequency values, the same modulation amplitudes, and the same relative phase shifts as in the previous case.

In the following step C'), the modulator 150 generates a main plurality of rays by modulating the main ray by the complex signal.

The plurality of rays thus generated comprises, as in the previous case, thirteen rays spaced from one another by the first frequency value F.

Finally, in the following step D'), a comb is formed from the rays of the main plurality of rays.

As in the previous case, according to an alternative embodiment, an additional modulator similar to the additional modulator described above, may be placed downstream of the main modulator 150.

In this case, the generation method according to the second embodiment of the invention further comprises a step E') in which the additional modulator triples the comb generated during step D').

The frequency comb generation device according to the second embodiment of the invention is advantageous in that it makes it possible to reduce the number of optical components used. This makes it possible, in particular, to reduce the costs relating to the installation.

The invention claimed is:

1. A method of generating frequency combs composed of a predetermined number of rays, the method comprising: modulation of a main ray generated by a laser source, by a first radiofrequency signal at a first frequency value, by a second radiofrequency signal at a second frequency value, and by a third radiofrequency signal at a third frequency value;
   the second frequency value being equal to twice the first frequency value;
   the third frequency value being equal to three times the first frequency value; and
   wherein the modulation by the first radiofrequency signal is performed with a modulation amplitude substantially equal to 1.6418 radians and a relative phase shift substantially equal to 21.8°.

2. The method according to claim 1, wherein the frequency comb is composed of thirteen rays regularly spaced from each other by the first frequency value and substantially equal to each other in power.

3. The method according to claim 1, wherein the modulation by the second radiofrequency signal is performed with a modulation amplitude substantially equal to 1.3549 radians and a relative phase shift substantially equal to 43.6°.

4. The method according to claim 1, wherein the modulation by the third radiofrequency signal is performed with a modulation amplitude substantially equal to 2.2829 radians and a relative phase shift substantially equal to 245.4°.

5. The method according to claim 1, comprising the following steps:
   A) generation of the main ray by the laser source;
   B) generation of a first plurality of rays by modulating the main ray by one of the first radiofrequency signal, the second radiofrequency signal, or the third radiofrequency signal;
   C) generation of a second plurality of rays by modulating each ray of the first plurality of rays with one of the first radiofrequency signal, the second radiofrequency signal, or the third radiofrequency signal other than the radiofrequency signal used in step B);
   D) generation of a third plurality of rays by modulating each ray of the second plurality of rays with one of the first radiofrequency signal, the second radiofrequency signal, or the third radiofrequency signal other than the radiofrequency signals used in steps B) and C); and
   E) formation of a comb from the rays of the third plurality of rays.

6. The method according to claim 1, comprising the following steps:
   A') generation of the main ray by the laser source;
   B') generation of a complex signal corresponding to a sum of the first radiofrequency signal, the second radiofrequency signal, or the third radiofrequency signal;
   C') generation of a main plurality of rays by modulating the main ray by the complex signal; and
   D') formation of a comb from the rays of the main plurality of rays.

7. The method according to claim 5, further comprising a step of modulating comb rays at an additional frequency value greater than the third frequency value.

8. The method according to claim 6, further comprising a step of modulating comb rays at an additional frequency value greater than the third frequency value.

9. The method according to claim 7, wherein the additional frequency value is between 20 and 40 GHz.

10. A frequency comb generation module, the comb being composed of the predetermined number of rays, the module being configured to implement the method according to claim 1.

11. A method of LIDAR-type remote spectroscopy of a targeted material, comprising the following steps:
    generation of a transmission signal comprising at least one comb generated according to the method according to claim 1;
    transmission of the transmission signal to the targeted material;
    reception of a response signal corresponding to the transmission signal reflected by the targeted material; and
    analysis of the response signal.

12. The method according to claim 11, wherein the first frequency value is selected based on the physical characteristics of the targeted material.

13. A LIDAR remote spectroscopy device configured to implement the method according to claim 11.

* * * * *